United States Patent [19]
Fisher et al.

[11] Patent Number: 5,802,268
[45] Date of Patent: Sep. 1, 1998

[54] DIGITAL PROCESSOR WITH EMBEDDED EEPROM MEMORY

[75] Inventors: Aaron Louis Fisher, Allentown; Alan Joel Greenberger, South Whitehall Township, Lehigh County; Jay Patrick Wilshire, Pennsburg, all of Pa.

[73] Assignee: Lucent Technologies Inc., Murray Hill, N.J.

[21] Appl. No.: 856,035

[22] Filed: May 14, 1997

Related U.S. Application Data

[63] Continuation of Ser. No. 343,395, Nov. 22, 1994, abandoned.

[51] Int. Cl.⁶ .................................................. G06F 11/00
[52] U.S. Cl. ........................... 395/183.01; 371/21.1; 365/185.29
[58] Field of Search ................... 395/183.01, 183.18; 371/21.1, 21.2; 365/185.01, 185.18, 185.29, 200, 207; 364/243.3

[56] References Cited

U.S. PATENT DOCUMENTS

| | | |
|---|---|---|
| 4,400,798 | 8/1983 | Francis et al. |
| 4,785,425 | 11/1988 | Lavelle .......................... 365/52 |
| 4,800,119 | 1/1989 | Heene et al. |
| 5,187,683 | 2/1993 | Gill et al. ..................... 365/185 |
| 5,191,556 | 3/1993 | Radjy ............................ 365/235 |
| 5,267,209 | 11/1993 | Yoshida ....................... 365/185 |
| 5,276,839 | 1/1994 | Robb et al. ................... 364/200 |
| 5,386,539 | 1/1995 | Nishi ............................ 364/200 |
| 5,436,913 | 7/1995 | Yamamura et al. ........... 371/21.2 |
| 5,481,742 | 1/1996 | Worley et al. ................ 395/800 |
| 5,490,109 | 2/1996 | Salmm ......................... 365/185.17 |

*Primary Examiner*—Albert Decady
*Attorney, Agent, or Firm*—David L. Smith

[57] ABSTRACT

There is disclosed an integrated circuit including a digital processor having EEPROM and a control register. The digital processor is capable of receiving data to be programmed into the EEPROM and is capable of programming the data into the EEPROM. The digital processor includes a control register for receiving bits to control a write line and an erase line. The digital processor also includes a processor core coupled to the control register by a data bus, the digital processor is coupled to the EEPROM by a ROM address bus and a RAM data bus. The EEPROM memory location identified by the ROM address bus is programmed to retain data latched onto the RAM data bus. This is achieved by the digital processor writing control bits to the control register to enable the write line for a write operation of sufficient duration to assure that the data on the RAM data bus is retained in the EEPROM memory address that is enabled.

22 Claims, 2 Drawing Sheets

5,802,268

DIGITAL PROCESSOR WITH EMBEDDED EEPROM MEMORY

This application is a continuation of application Ser. No. 08/343,395, filed on Nov. 22, 1994, now abandoned.

TECHNICAL FIELD

This invention relates generally to microprocessors having read-only memory, and in particular to digital processors with embedded electrically erasable programmable read-only memory (EEPROM).

BACKGROUND OF THE INVENTION

Digital processors such as microcomputers, microcontrollers, digital signal processors, or other microprocessors typically incorporate a read-only memory (ROM) in which a program, or code as it is sometimes called, is stored to control operation of the digital processor. During the program development process, the developer often uses random access memory (RAM) to store code that is ultimately to be embedded in ROM in a product production phase. When the developer believes the code is debugged, a file of the code is provided to a digital processor manufacturer to manufacture a digital processor incorporating the debugged code in ROM. A custom mask is developed by the digital processor manufacturer to include the user-supplied code in the ROM of a digital processor. Digital processors incorporating the code in ROM are fabricated and tested by the manufacturer, then shipped to the user. The user tests the digital processor, and if a change in the ROM code is necessary, the cycle begins over again with the user providing a file of the revised code to the digital processor manufacturer. This is an expensive and time consuming process.

Of course, the same development could be achieved with a RAM module substituted for the ROM. However, for the same memory capacity, RAM is physically larger than ROM. RAM of the necessary memory capacity is often too large for the existing package of the digital processor. To utilize RAM in the allocated area would not provide sufficient memory capacity.

While digital processor systems incorporating EEPROMS are known, such as disclosed in U.S. Pat. No. 5,261,055, the EEPROM is programmed by a system external to the digital processor, typically through external pins on the integrated circuit that go directly to the EEPROM. To program or reprogram an EEPROM in the known systems, a development tool such as a personal computer is typically coupled through a pod or cable to the digital processor. The EEPROM is erased and programmed or reprogrammed by the external system through the external pins.

SUMMARY OF THE INVENTION

An integrated circuit includes a digital processor having EEPROM and a control register. The digital processor is capable of receiving data to be programmed into the EEPROM and is capable of programming the data into the EEPROM. The digital processor includes a control register for receiving bits to control a write line and an erase line. The digital processor also includes a processor core coupled to the control register by a data bus. The digital processor is coupled to the EEPROM by a ROM address bus and a RAM data bus. The EEPROM memory location identified by the ROM address bus is programmed to retain data latched onto the RAM data bus. This is achieved by the digital processor writing control bits to the control register to enable the write line for a write operation of sufficient duration to assure that the data on the RAM data bus is retained in the EEPROM memory address that is enabled.

DETAILED DESCRIPTION

Figure 1:
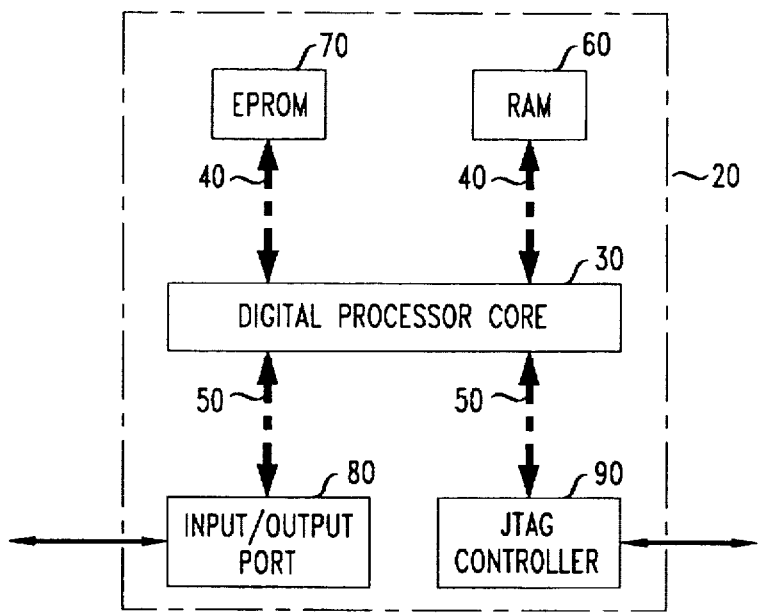
FIG. 1 is a block diagram of a digital processor in accordance with an illustrative embodiment of the invention.

FIG. 1 shows a block diagram of an illustrative embodiment of a digital processor 20 in accordance with the present invention. Digital processor 20 can be a microcomputer, microcontroller, digital signal processor, or other microprocessor. A digital processor core 30 is coupled by a bus or buses 40, 50 to random access memory (RAM) 60, electrically erasable programmable read-only memory (EEPROM) 70, an input/output (I/O) port 80, and a JTAG controller 90. Each of the I/O port 80 and JTAG controller can communicate with systems external to digital processor 20. JTAG controller 90 and its communication capability are disclosed in U.S. Pat. No. 5,355,369, issued Oct. 11, 1994, entitled High-Speed Integrated Circuit Testing With JTAG, which is hereby incorporated by reference. Read-only memory (not shown) may be present and coupled to digital processor core 30, although it is not necessary.

Figure 2:
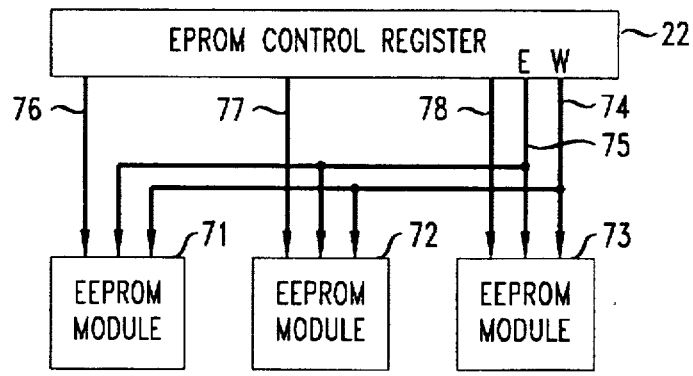
FIG. 2 is a block diagram showing three EEPROM modules coupled to a flash control register.

In the illustrative embodiment, EEPROM 70 is comprised of several modules. In FIG. 2 EEPROM 70 is shown as having three modules 71, 72 and 73. EEPROM modules 71, 72 and 73 are controlled by flash control register 22. Flash control register 22 is accessible by digital processor core 30 and is capable of having its contents written or read by digital processor core 30. Each EEPROM module 71, 72 and 73 has coupled thereto a write enable line 74 and an erase line 75. Since there are more than one EEPROM module, individual module enable lines 76, 77 and 78 couple flash control register 22 to respective EEPROM modules 71, 72 and 73. In the illustrative embodiment, each EEPROM module consists of 4096 words, each containing 16 bits.

Figure 3:
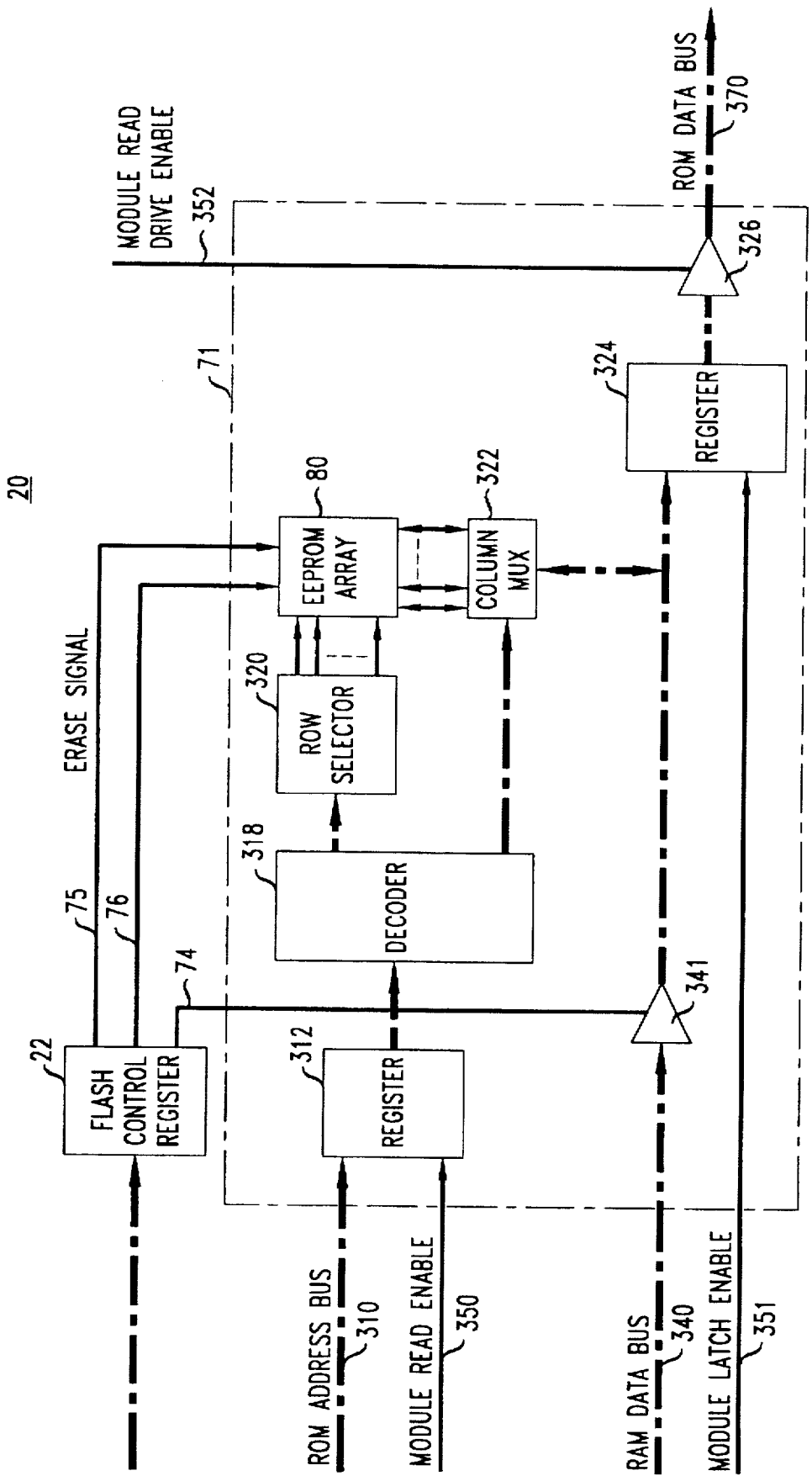
FIG. 3 is a schematic diagram showing in more detail the control of a EEPROM module in FIG. 2.

FIG. 3 illustrates how an EEPROM module is coupled to the ROM address and data buses as well as the RAM data bus. EEPROM module 71 is illustrative. The number of lines in the data and the address buses will vary depending upon the application. For a sixteen bit processor, the data buses will have sixteen lines. For a 4096 word EEPROM module, the address bus will have or use 12 lines.

The disclosed embodiment of EEPROM, is programmed by overwriting a logic zero in a cell to be a logic one. Other EEPROM is programmed by overwriting a logic one in a cell to be a logic zero. Cells in which it is desired to have a logic zero are left unchanged. Therefore, it is imperative that the EEPROM module be erased prior to being programmed to assure that all bits are initialized to a logic zero. To erase any EEPROM module, such as module 71, digital processor core 30 writes bits to flash control register 22 to enable a particular EEPROM module, and to enable the erase line 75. EEPROM module 72 and 73 are erased in a similar manner with their respective module enable lines 77 and 78 activated by flash control register 22 or controlled by digital processor core 30. The EEPROM module enabled during the erase operation has all cells reset to a logic zero, as is known in the art. Since an erase operation may not yield a one hundred percent erase, the erase operation must be verified. This is accomplished by reading all of the EEPROM words and comparing them to the expected bit values of zero. This may be achieved by the digital processor core 30 or through any communication mechanism or interface by a system beyond the digital processor.

To program or reprogram an EEPROM module, flash control register 22 is written to by the digital core 30. The existing hardware architecture of certain digital processors permits reading from ROM but does not permit writing to ROM. Therefore, an indirect method may be used to write to ROM. The architecture does permit writing to RAM. Data is read from the EEPROM module at the memory address, or word, that is going to be programmed by digital processor core 30. This places the address of the memory location that is going to be programmed on ROM address bus 310, which is a subset of buses 40. It also causes a module read enable 350 contained in buses 40 to go high thereby activating register 312. The address that is going to be programmed is then latched into register 312. The address latched in register 312 is decoded by decoder 318, which provides control signals to row selector 320 and column multiplexer 322. Row selector 320 addresses the word in EEPROM module 71 that is to be programmed. The address enables a particular word line, through row multiplexer 320, and selects a subset of the bit lines through column multiplexer 322. With the address to be programmed latched into register 312, the data that is to be programmed is written by digital processor core 30 on RAM data bus 340, which is a subset of buses 40. The memory location identified by the RAM address need not exist. The purpose of this write operation is to make the data that is to be programmed available to EEPROM module 71. The data written to RAM 60 is held by latches in processor core 30 at the input to EEPROM module 71 on bus 340 that otherwise is also coupled to RAM 60. Digital processor core 30 then writes to flash control register 22 to enable EEPROM write line 74. In the preferred embodiment, the entire 16 bits of a word of EEPROM module 71 are programmed or reprogrammed in a single write operation. Write line 74 enables the data held on bus 340 to be written to the selected bit lines by write buffer 341. Write line 74 also enables the EEPROM write circuitry, as is known in the art, that allows the electron transfer to proceed on the bits for which data is a logic one.

Since the EEPROM write operation takes a relatively long time, digital processor core 30 goes into a timing loop to wait. The timing loop is of sufficient duration for the write operation to be completed. At the end of the timing loop, digital processor core 30 of digital processor 20 writes to flash control register 22 to disable or turn off the write line 74.

To program the next word of EEPROM module 71, the sequence is repeated: an address to be programmed is latched into register 312; data to be programmed is written by digital processor core 30 to RAM 60 on RAM data bus 340; digital processor core 30 then writes to flash control register 22 to enable EEPROM write line 74; digital processor core 30 goes into a timing loop of sufficient duration for the write operation to be completed; and, at the end of the timing loop the digital processor core 30 writes control bits to flash control register 22 to disable write line 74. EEPROM modules 72 and 73 are programmed in a similar manner with their respective module enable lines 77 and 78 activated by flash control register 22 as controlled by digital processor core 30.

Programming or reprogramming EEPROM is an iterative process. When the EEPROM is programmed for the first time, a predetermined voltage level and duration of the write operation timing loop are employed. The last few words of EEPROM may be used to store the number of times the EEPROM has been programmed or reprogrammed, as well as the voltage level and duration of the timing loop of the last successful programming operation. The voltage level and duration of the write operation timing loop of the last successful write operation are obtained, typically by the external system from which the code will be transferred, from the last few words of EEPROM. These values are used as the initial values of voltage and timing loop duration in a reprogramming operation. If an attempt to reprogram EEPROM using these initial values of voltage and timing loop duration is not successful, as determined by the verification process, one or both of these values is changed and the programming sequence is repeated. Prior to repeating the programming sequence, the voltage level at which the EEPROM write operation is carried out is increased by a predetermined increment. Alternatively, the duration of the timing loop for the write operation to be complete may be incremented by a predetermined increment. Any combination of increasing the voltage and timing loop duration may be employed. In this manner, getting to the optimum voltage and timing loop duration to successfully reprogram the EEPROM is minimized.

After an EEPROM module has been programmed, it can be utilized as a ROM module would be used. In this case, digital core 30 presents to ROM address bus 310 an address to be read, together with the module read enable 350. The address is latched in register 312. Decoder 318 enables the word line through row selector 320. Decoder 318 also causes the appropriate bit lines, sixteen in the preferred embodiment, to be coupled to the input of register 324 by way of column multiplexer 322. Module latch enable 351 is a delayed version of module read enable 350. Module latch enable 351 causes data programmed in EEPROM array 80 to be latched by register 324. Module read drive enable 352 is a delayed version of module read enable 350. Module read drive enable 352 causes the data held in register 324 to be driven onto ROM data bus 370, which is a subset of buses 40.

In this manner, the digital processor 20 can program its own EEPROM 70 on the same integrated circuit as the digital processor, thereby obviating the need for an external system to program the EEPROM through pins of the integrated circuit. Programming the EEPROM can be achieved by downloading a program to the digital processor through any interface port, and does not depend on the JTAG port, although the JTAG port may be utilized. Programming the EEPROM, like erasing the EEPROM, is not always one hundred percent successful. Therefore it is prudent to verify that the data comprising a program has been successfully written to EEPROM. Like verifying the erase operation, this is accomplished by reading all of the EEPROM words that have been programmed and comparing them to the expected bit values of the program. This may be achieved by the digital processor 20 or through any communication mechanism or interface by a system beyond the digital processor.

The advantage of having a digital processor that is able to program its own EEPROM is that no special programming pins on the integrated circuit need to be dedicated to the EEPROM (other than possible D.C. voltages needed). The digital processor can be programmed to receive new contents for the EEPROM through the same input/output port that needs to be present for the application, factory testing, or in-circuit emulations.

Figure 4:
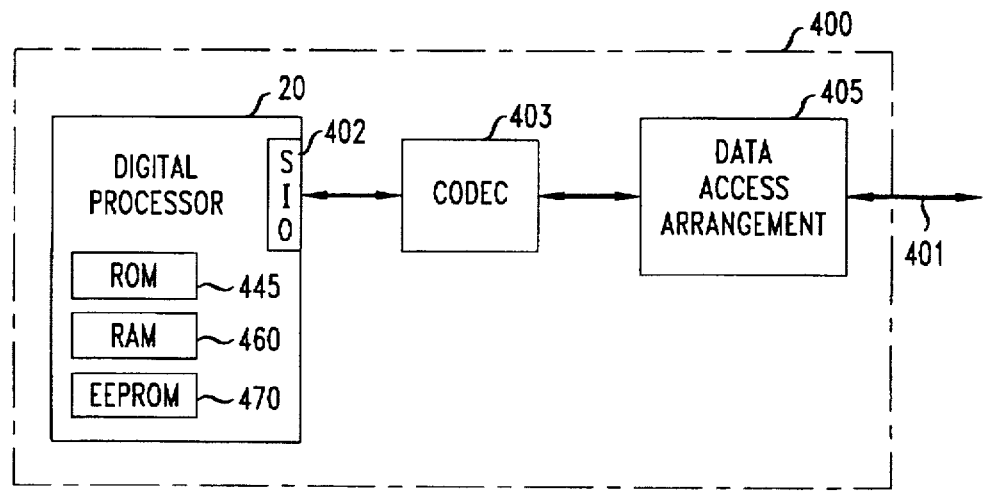
FIG. 4 is a schematic diagram showing a digital processor based modem having EEPROM programmable in accordance with the present invention.

An illustrative application of a digital processor with embedded EEPROM memory including a modem function is shown in FIG. 4. A modem 400 consists of a digital processor 20 containing EEPROM 470 coupled to a codec 403 which is coupled to a data access arrangement (DAA) 405. The DAA 405 interfaces a telephone line 401 to codec 403. The codec performs analog-to-digital and digital-to-analog functions and communicates with digital processor 20 through a serial input/output port 402 that is part of the digital processor. It is possible for the contents of the EEPROM 470 contained in digital processor 20 to be reprogrammed over the telephone line 401 through modem 400.

One or more modules of EEPROM 470, or optional ROM 445, remain operable while one or more modules of EEPROM 470 are reprogrammed. The data to be written to one or more modules of EEPROM 470 is transmitted to the modem, such as over telephone line 401. Codec 403 transforms the encoded bits to bits in a serial data stream which is provided to digital processor 20 through serial input-output port 402. The data is downloaded to RAM 460. A set of instructions is executed by digital processor 20 in which digital processor 20 reprograms one or more modules of EEPROM 470, in the manner described above, with the data. This technique is also applicable to modems that are not coupled to telephone wires such as cellular telephone terminals. In this manner, the modem supplier can correct errors in the modem code or can upgrade the application features by providing new modem features, without access to a dedicated EEPROM programmer or special pins. Similarly, a base station could download to the modem in a cellular terminal data to be retained in the EEPROM even after power to the terminal has been turned off and back on.

While various types of EEPROM exist, as noted above, the invention is not limited to the illustrative embodiment EEPROM which is programmed by overwriting a logic zero with a logic one.

We claim:

1. A method of programming memory locations of EEPROM on an integrated circuit in read-only memory space, the integrated circuit having a RAM, a RAM data bus, an address bus, and a digital processor with a core including a control register, the method comprising the steps of:

reading data from the EEPROM to enable a particular word line at an address of a memory location that is to be programmed;

latching the address into a register;

writing data to RAM which causes data to be held on the RAM data bus;

writing to a control register to enable an EEPROM write control;

waiting a predetermined time period of sufficient duration to permit the write operation to be completed; and writing to a control register to disable the write control.

2. The method of programming EEPROM as recited in claim 1, further comprising the step of:

setting the duration of a timing loop to be of a sufficient length of time for a write operation to be completed.

3. The method of programming EEPROM as recited in claim 1, further comprising:

storing the duration of time of a timing loop of a successful write operation.

4. The method of programming EEPROM as recited in claim 1, further comprising:

reading the duration of time of a timing loop used in the last successful EEPROM programming operation; and setting the duration of a write operation timing loop to be the same duration as the duration of the last successful EEPROM programming operation.

5. The method of programming EEPROM as recited in claim 1, further comprising:

verifying whether data has been successfully written to the EEPROM.

6. The method of programming EEPROM as recited in claim 5, further comprising:

upon verifying that the writing operation was unsuccessful, increasing the duration of a writing loop by a predetermined increment.

7. The method of programming EEPROM as recited in claim 5, further comprising:

upon verifying that the writing operation was unsuccessful increasing the voltage level used in the writing operation by a predetermined increment.

8. A method of programming an EEPROM as recited in claim 1, further comprising the step of:

erasing the EEPROM memory locations prior to reading data from the EEPROM to enable a particular word line.

9. A method of programming an EEPROM as recited in claim 1, wherein the step of writing to a control register to enable an EEPROM write control, comprises:

writing bits to the control register to activate a write control line.

10. A method of programming an EEPROM as recited in claim 1, wherein the step of writing data to RAM which causes data to be held on the RAM data bus comprises:

latching a word of the program into a register.

11. A method of programming an EEPROM as recited in claim 1, wherein the step of waiting a predetermined amount of time comprises:

entering a timing loop.

12. An integrated circuit having programmable memory in a read-only memory space, comprising:

an EEPROM coupled to a ROM address bus and a data bus;

a control register for receiving bits to control a write line and an erase line;

a read address latch to latch the address of a memory location being read, so that a memory location at the same address may be subsequently written to;

a digital processor including the EEPROM and the control register, the digital processor adapted to receive data transferred into the EEPROM and adapted to transfer the data into the EEPROM, the digital processor having a core coupled to the control register by a data bus to provide control bits thereto, the digital processor core coupled to the EEPROM by the ROM address bus and the data bus such that a memory location at an EEPROM address on the ROM address bus is latched into the read address latch upon being read and is programmed to retain data presented on the data bus by the digital processor writing control bits to a control register to cause a write line to make a predetermined logic state for the duration of a write operation.

13. A method of programming programmable read only memory on an integrated circuit in read-only memory space, the integrated circuit having a digital processor, comprising the steps of:

reading the content of a memory location;

latching an address of the memory location into a register;

writing data on a data bus;

enabling a programmable read only memory write line; and transferring the data from the data bus to the memory location of the latched address of programmable read-only memory in read-only memory space.

14. The method of claim 13, further comprising the step of downloading the data through a port to the digital processor.

15. The method of claim 13, further comprising the step of setting a write operation timing loop duration to be of a sufficient length of time for a write operation to be completed.

16. The method of claim 15, further comprising the step of storing a duration of time of a timing loop of a successful write operation.

17. The method of claim 15, further comprising the steps of:

reading a duration of time of a timing loop used in a successful write operation; and setting the duration of a write operation timing loop to be the same duration as the duration of the last successful write operation.

18. The method of claim 13, further comprising:

verifying whether data has been successfully written to the programmable read only memory.

19. The method of claim 18, further comprising:

upon verifying that the write operation was unsuccessful, increasing the duration of a write loop by a predetermined increment.

20. The method of claim 18, further comprising:

upon verifying that the writing operation was unsuccessful increasing the voltage level used in the writing operation by a predetermined increment.

21. The method of claim 13, further comprising the step of:

erasing the memory locations prior to reading data from the programmable read only memory to enable a particular word line.

22. A method of programming programmable read-only memory in read-only memory space of a digital processor, comprising the steps of:

reading from memory space at an address to place an address on a read-only memory address bus:

latching the address into a register;

writing on a random access memory data bus to the latched address to make data available to programmable memory in read-only memory space;

enabling a programmable memory write line; and transferring data from the data bus to the memory location of the latched address of programmable memory in read-only memory.

\* \* \* \* \*